United States Patent
Danciu et al.

(10) Patent No.: US 8,996,452 B2
(45) Date of Patent: *Mar. 31, 2015

(54) GENERATING A PREDICTIVE MODEL FROM MULTIPLE DATA SOURCES

(75) Inventors: Marius I. Danciu, Cluj-Napoca (RO); Fan Li, Xi'an (CN); Michael McRoberts, Rochester, MN (US); Jing-Yun Shyr, Naperville, IL (US); Damir Spisic, Chicago, IL (US); Jing Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/545,817

(22) Filed: Jul. 10, 2012

(65) Prior Publication Data

US 2012/0278275 A1 Nov. 1, 2012

Related U.S. Application Data

(63) Continuation of application No. 13/048,536, filed on Mar. 15, 2011.

(51) Int. Cl.
G06F 7/00 (2006.01)
G06F 17/00 (2006.01)
G06Q 10/06 (2012.01)

(52) U.S. Cl.
CPC ..................................... G06Q 10/06 (2013.01)
USPC ................................. 707/603; 706/21; 703/2

(58) Field of Classification Search
USPC .................................. 707/603; 706/21; 703/2
See application file for complete search history.

(56) References Cited

U.S. PATENT DOCUMENTS

| 7,272,617 | B1 * | 9/2007 | Bayer et al. ................... 707/810 |
| 7,523,123 | B2 | 4/2009 | Yang et al. |
| 7,730,003 | B2 | 6/2010 | Pinto et al. |
| 8,533,222 | B2 * | 9/2013 | Breckenridge et al. ........ 707/774 |
| 2003/0088565 | A1 | 5/2003 | Walter et al. |
| 2005/0096950 | A1 * | 5/2005 | Caplan et al. ..................... 705/7 |
| 2005/0234698 | A1 * | 10/2005 | Pinto et al. ..................... 703/22 |
| 2005/0234763 | A1 | 10/2005 | Pinto et al. |
| 2006/0282306 | A1 | 12/2006 | Thissen-Roe |
| 2007/0150424 | A1 | 6/2007 | Igelnik |

(Continued)

OTHER PUBLICATIONS

Barrow, Devon K. et al., An Evaluation of Neural Network Ensembles and Model Selection for Time Series Prediction, The 2010 International Joint Conference on Neural Networks, Jul. 18-23, 2010, pp. 1-8, Institute of Electrical and Electronics Engineers, Inc., Danvers, MA, US. [Also total 8 pp.].

(Continued)

*Primary Examiner* — Sherief Badawi
*Assistant Examiner* — Christopher J Raab
(74) *Attorney, Agent, or Firm* — Janaki K. Davda; Konrad, Raynes, Davda and Victor LLP

(57) ABSTRACT

Techniques are disclosed for generating an ensemble model from multiple data sources. In one embodiment, the ensemble model is generated using a global validation sample, a global holdout sample and base models generated from the multiple data sources. An accuracy value may be determined for each base model, on the basis of the global validation dataset. The ensemble model may be generated from a subset of the base models, where the subset is selected on the basis of the determined accuracy values.

5 Claims, 4 Drawing Sheets

(56) References Cited

U.S. PATENT DOCUMENTS

| | | | |
|---|---|---|---|
| 2007/0255646 A1* | 11/2007 | Morris et al. | 705/38 |
| 2008/0059115 A1 | 3/2008 | Wilkinson | |
| 2008/0140609 A1 | 6/2008 | Werner et al. | |
| 2008/0228680 A1 | 9/2008 | Chen et al. | |
| 2009/0043715 A1 | 2/2009 | Fan et al. | |
| 2009/0177598 A1 | 7/2009 | Bhaskar et al. | |
| 2009/0182696 A1 | 7/2009 | Menahem et al. | |
| 2009/0210371 A1 | 8/2009 | Laan | |
| 2009/0222243 A1* | 9/2009 | Zoldi et al. | 703/2 |
| 2009/0299896 A1* | 12/2009 | Zhang et al. | 705/38 |
| 2010/0010878 A1 | 1/2010 | Pinto et al. | |
| 2010/0153184 A1* | 6/2010 | Caffrey et al. | 705/10 |
| 2010/0257198 A1 | 10/2010 | Cohen et al. | |
| 2011/0066454 A1* | 3/2011 | Rosauer et al. | 705/4 |
| 2011/0105852 A1 | 5/2011 | Morris et al. | |
| 2011/0246403 A1* | 10/2011 | Statnikov et al. | 706/20 |

OTHER PUBLICATIONS

Bifet, Albert et al., New Ensemble Methods for Evolving Data Streams, Proceedings of the 15th ACM SIGKDD International Conference on Knowledge Discovery and Data Mining, 2009, ACM, New York, New York, US., Total 9 pp.

Chu, C., S.K. Kim, Y. Lin, Y.Y. Yu, G. Bradski, A.Y. Ng, and K. Olukotun, "Map-Reduce Machine Learning on Multicore", Neural Information Processing Systems Foundation, Dec. 2007, Total 8 pp.

Fan, M., "Missing Data Analysis—Multiple Imputation", [Online], Apr. 30, 2008, [Retrieved on Nov. 30, 2011] Retrieved from the internet at <URL: http://staff.washington.edu/tylbrian/Stats_Pres_Missing_Data.ppt>, Total 41 pp.

Folino, G., C. Pizzuti, and G. Spezzano, "An Adaptive Distributed Ensemble Approach to Mine Concept-Drifting Data Streams", In Proceedings of the 19th IEEE International Conference on Tools with Artificial Intelligence, 2007, Total 5 pp.

Folino, G., C. Pizzuti, and G. Spezzano, "Training Distributed GP Ensemble with a Selective Algorithm Based on Clustering and Pruning for Pattern Classification", IEEE Transactions on Evolutionary Computation, vol. 12, Iss. 4, Aug. 2008, Total 29 pp.

Gardner, D., "How Smart Can Analytics Get?", [online] Jan. 24, 2010, [Retrieved on Dec. 20, 2010], Retrieved from the Internet at <URL: http://www.ecommercetimes.com/story/69180.html?wlc=1288207841&wlc=1288283038>, Total 6 pp.

Ghosh, J., "Simultaneous (Co)-Clustering and Modeling for Large Scale Data Mining", Fall Creek Falls Conference, [online], Sep. 24, 2009, Retrieved from the Internet at <URL: http://computing.orni.gov/workshops/FallCreek09/agenda.html>, Total 61 pp.

Grossman, R., "From Data to Decisions: new Strategies for Deploying Analytics Using Clouds", Jul. 29, 2009, Total 28 pp.

Howell, D.C., "The Treatment of Missing Data", [Online], [Retrieved on Nov. 30, 2011], Retrieved from the Internet at <URL: http://www.uvm.edu/~dhowell/StatPages/More_Stuff/Missing_Data/MissingDataFinal.pdf>, 44 pp. [Also available at: Howell, D.C. (2007). The Treatment of Missing Data. In Outhwaite, W. & Turner, S. (eds.) The Sage Handbook of Social Science Methodology (p. 208-224). London: Sage]. [Also total 44 pp.].

IBM, "Method and Apparatus for Efficient Grouping in Map-Reduce Applicationson on GPU", Intellectual Property Library, Nov. 18, 2009, Amherst, NY, US, Total 7 pp.

International Society for Bayesian Analysis, "Bayesian Analysis", vol. 2, No. 1, [online], 2007, [Retrieved on Nov. 30, 2011], Retrieved from the Internet at <URL: http://ba.stat.cmu.edu/journal/2007/vol02/issue01/issue01.pdf>, Total 239 pp.

Kumar, V., H. Andrade, B. Gedik, and K. Wu, "DEDUCE: At the Intersection of MapReduce and Stream Processing", In the Proceedings of the 13th International Conference on Extending Database Technology, Mar. 2010, Total 6 pp.

Loh, W., "Classification and Regression Trees", WIREs Data Mining and Knowledge Discovery, vol. 1, [Online], Jan./Feb. 2011, [Retrieved on Nov. 30, 2011], Retrieved from the Internet at <URL: http://www.stat.wisc.edu/~loh/treeprogs/guide/wires10.pdf>, Total 10 pp.

Loshin, D., "Together, Showing the Way", Teradata Magazine, [online] Q2/2010, Retrieved from the Internet at <URL: http://www.teradatamagazine.com/v10n02/Tech2Tech/Together-Showing-the-way/>, Total 3 pp.

Mell, P. and T. Grance, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", NIST Special Publication 800-145(Draft), Jan. 2011, Total 7 pp.

Mikkilineni, R., and V. Sarathy, "Cloud Computing and the Lessons from the Past", In Proceedings of the 18th IEEE International Workshop on Enabling Technologies: Infrastructures for Collaborative Enterprises, 2009, Total 6 pp.

Preliminary Amendment, Jul. 10, 2012, for U.S. Appl. No. 13/048,536, filed Mar. 15, 2011 by M.I. Danciu et al., Total 5 pp.

Preliminary Remarks for U.S. Appl. No. 13/403,863, filed Apr. 20, 2012, Total 1 p.

Preliminary Remarks for U.S. Appl. No. 13/445,796, filed Apr. 20, 2012, Total 1 p.

Parthasarathy, S., A. Ghoting, and M.E. Otey, "A Survey of Distributed Mining of Data Streams", Data Streams: Models and Algorithms, Chapter 13, 2007, Springer Science+Business Media, LLC, New York, New York, US, Total 19 pp.

Raden, N., "Advanced In-Database Analytics Done Right", May 2010, Total 17 pp.

Sorjamaa, A. and A. Lendasse, "Fast Missing Value Imputation Using Ensemble of SOMS", TKK Reports in Information and Computer Science, TKK-ICS-R33, [Online], 2010, [Retrieved on Nov. 30, 2011], Retrieved from the Internet at <URL: http://lib.tkk.fi/Reports/2010/isbn9789526032481.pdf>, Total 24 pp.

Taylor, J., "First Look—Cloudera", [online] Sep. 21, 2010, [Retrieved on Dec. 20, 2010], retrieved from the Internet at <URL: http://jtonedm.com/2010/09/21/first-look-cloudera/>, Total 5 pp.

U.S. Appl. No. 13/445,796, filed Apr. 12, 2012, entitled "Missing Value Imputation for Predictive Models", invented by Y.J. Chu et al., Total 45 pp.

U.S. Appl. No. 13/048,536, filed Mar. 15, 2011, entitled "Generating a Predictive Model from Multiple Data Sources", invented by Danciu, M.I., F. Li, M. Mcroberts, J. Shyr, D. Spisic, and J. Xu, Total 25 pp.

U.S. Appl. No. 13/399,838, filed Feb. 17, 2012, entitled "Computing and Applying Order Statistics for Data Preparation", invented by Y.J. Chu et al., Total 45 pp.

U.S. Appl. No. 13/403,863, filed Feb. 23, 2012, entitled "Missing Value Imputation for Predictive Models", invented by Y.J. Chu et al., Total 48 pp.

Visalakshi, N.K. and K. Thangavel, "Ensemble Based Distributed Soft Clustering", International Conference on Computing, Communication and Networking, 2008, Dec. 18-20, 2008, pp. 1-6, St. Thomas, U.S. Virgin Islands, Total 6 pp.

Von Hippel, P.T., "Data Analysis with Missing Values", [Online], May 2, 2003, [Retrieved on Nov. 30, 2011], retrieved from the Internet at <URL: http://www.sociology.ohio-state.edu/ptv/faq/missing/missing.ppt>, Total 33 pp.

Wegener D., M. Mock, D. Adranale, and S. Wrobel, "Toolkit-Based High-Performance Data Mining of Large Data on MapReduce Clusters", In Proceedings of the 2009 IEEE International Conference on Data Mining Workshops, Dec. 2009, Total 6 pp.

Amendment 1, Jan. 7, 2013, for U.S. Appl. No. 13/048,536, filed Mar. 15, 2011 by M.I. Danciu et al., Total 9 pp.

Office Action 1, Oct. 5, 2012, for U.S. Appl. No. 13/048,536, filed Mar. 15, 2011 by M.I. Danciu et al., Total 72 pp.

(56) References Cited

OTHER PUBLICATIONS

Final Office Action, dated Apr. 25, 2013, for U.S. Appl. No. 13/048,536, entitled "Generating a Predictive Model From Multiple Data Sources", filed Mar. 15, 2011, invented by Marius Danciu et al., pp. 1-22.
Response to Final Office Action, dated Jul. 25, 2013, for U.S. Appl. No. 13/048,536, entitled "Generating a Predictive Model From Multiple Data Sources", filed Mar. 15, 2011, invented by Marius Danciu et al., pp. 1-11.
Kinney, S. et al, "Model Selection When Multiple Imputation is Used to Protect Confidentiality in Public Use Data", Journal of Privacy and Confidentiality, dated 2010, 2, No. 2, pp. 3-19 (Total 18 pages).
Notice of Allowance, dated Dec. 23, 2013, for U.S. Appl. No. 13/403,863, filed Feb. 23, 2012, entitled, "Missing Value Imputation for Predictive Models", invented by Yea Chu et al., Total 23 pages.
Notice of Allowance, dated May 22, 2014, for U.S. Appl. No. 13/403,863, filed Feb. 23, 2012, entitled "Missing Value Imputation for Predictive Models", invented by YJ. Chu et al., Total 27 pages.
Office Action, dated Mar. 21, 2014, for U.S. Appl. No. 13/048,536, filed Mar. 15, 2011, entitled, "Generating a Predictive Model From Multiple Data Sources", invented by Marius Danciu et al. , Total 22 pages.
Response to Office Action, dated Jun. 20, 2014, for U.S. Appl. No. 13/048,536, filed Mar. 15, 2011, entitled, "Generating a Predictive Model From Multiple Data Sources", invented by Marius Danciu et al. , Total 10 pages.
Notice of Allowance, dated Oct. 23, 2014, for U.S. Appl. No. 13/048,536 (54.87), filed Mar. 15, 2011, invented by Marius Danciu et al., Total 12 pages.

* cited by examiner

GENERATING A PREDICTIVE MODEL FROM MULTIPLE DATA SOURCES

CROSS-REFERENCE TO RELATED APPLICATION

This application is a continuation of U.S. patent application Ser. No. 13/048,536, filed on Mar. 15, 2011, which application is incorporated herein by reference in its entirety.

BACKGROUND

Data mining is an application of computer databases to extract useful information from large volumes of data. Extracting the useful information may include processing the large volumes of data, identifying the most significant and/or meaningful patterns, and presenting the identified patterns as knowledge for achieving the goals of a user. For a data mining application to be widely applicable, a user should be able to supply the data mining application with data specific to a problem domain, without having to inform the data mining application about the nuances of the problem domain. The data mining application may then identify patterns with respect to the supplied data.

SUMMARY

Embodiments of the invention provide a computer-implemented method, computer program product and system for performing an operation that includes generating, for each of a plurality of data sources, a validation sample, a holdout sample and a base model from the respective data source. The operation also includes merging the validation samples and the holdout samples for the plurality of data sources into a global validation dataset and a global holdout dataset, respectively. The operation also includes determining an accuracy value for each base model, based on the global validation dataset. The operation also includes generating an ensemble model from a subset of the base models that are selected based on the determined accuracy values.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
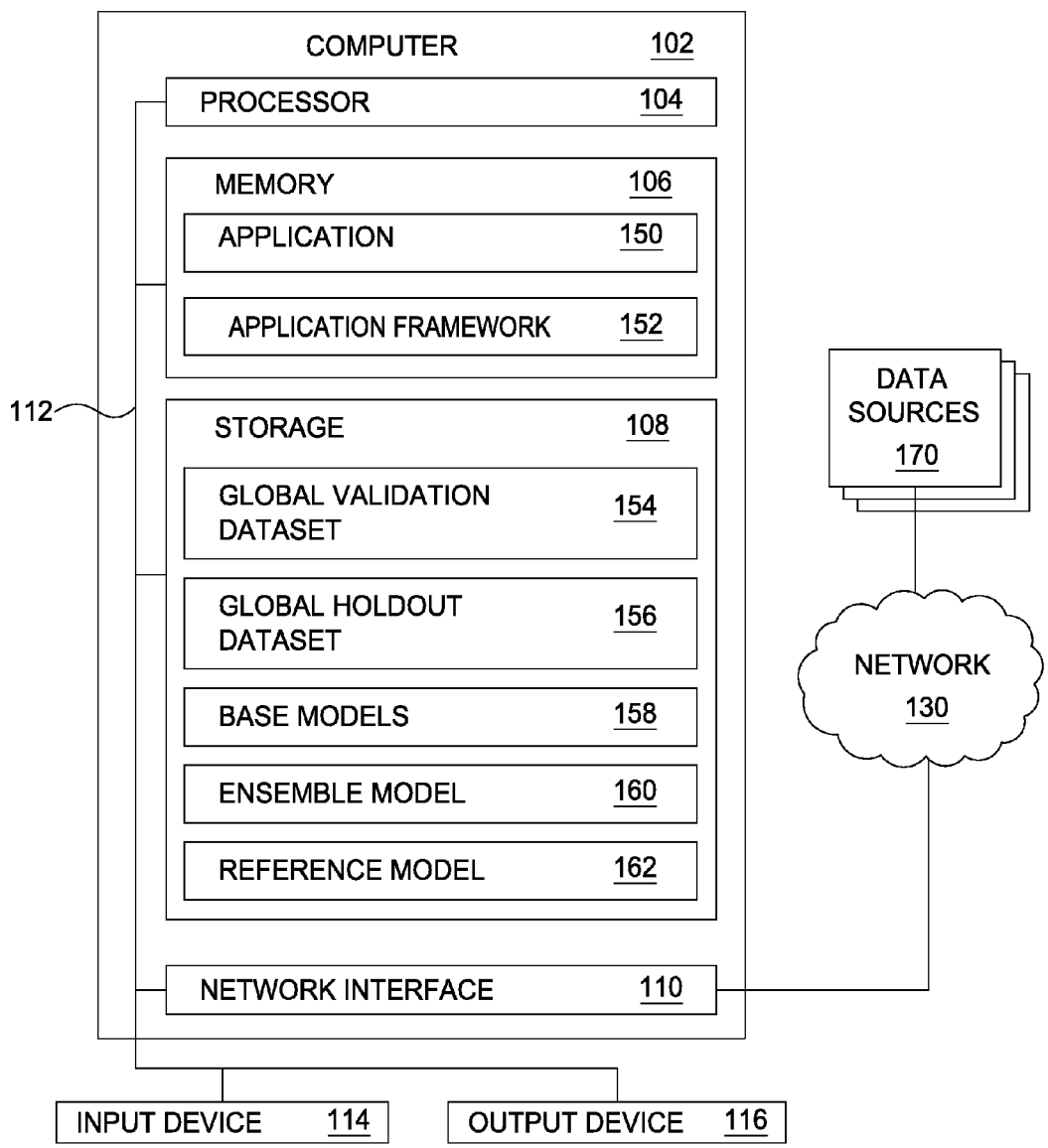
FIG. 1 is a block diagram illustrating a system for generating one or more predictive models from multiple data sources, according to one embodiment of the invention.

Embodiments of the invention provide techniques for generating predictive models from multiple data sources. Predictive modeling refers to an area of data mining and knowledge discovery that is directed toward extracting data patterns having predictive value. For example, predictive modeling may be used in the direct-mail marketing industry to improve return on marketing investment by ranking consumers according to their predicted response to promotional materials and mailing the promotional materials only to those consumers deemed most likely to respond and generate revenue. Predictive modeling may also be used in the credit industry to determine a probability that a consumer or business will default on a loan of a specified size, based information known about the consumer or business. The predictive models may then be used in deciding whether to grant loans and/or determining maximum loan amounts. Predictive modeling may also be used in the insurance industry to determine a frequency with which a consumer or business will file insurance claims and/or an average loss amount per claim. The predictive models may then be used to set insurance premiums and/or to set underwriting rules for different categories of insurance coverage. Predictive modeling may also be used in the Internet advertising industry to determine a probability that a user will click through an advertisement, based on information known about the user and the content in the advertisement. The predictive models may then be used to select an advertisement to serve to each user, to improve click-through rates and/or revenue. Of course, the above applications of predictive modeling are merely exemplary and are not intended to be limiting of the disclosure, and other applications of predictive modeling are broadly contemplated.

One embodiment of the invention provides an application configured to generate predictive models from multiple data sources. To this end, the application may make one or more calls to an application programming interface (API) supported by an underlying application framework. The application framework may be configured to support distributed computing on vast amounts of data and using a cluster of compute nodes. In some embodiments, the data may amount to petabytes of data and the cluster may include thousands of compute nodes. To facilitate distributed computing, the application framework may schedule operations to be performed by the compute nodes, monitor the compute nodes and/or the operations being performed and reschedule failed operations to be re-performed by the compute nodes. The operations may include at least a map operation and/or a reduce operation, which are further described below. The application may make an API call to the application framework, to provide implementations of the map operation and the reduce operation to the application framework. The implementations may be provided using object-oriented techniques, such as by implementing interfaces and/or abstract classes supported by the application framework. By providing implementations of the map operation and the reduce operation, the application may configure the application framework to suit the needs of the application. The application may also make additional API calls to the application framework, to specify locations of desired input data sets and output data sets, respectively.

As described above, in one embodiment, the application is configured to generate predictive models from multiple data sources. However, depending on the embodiment, some or all of the functionality of the application may be performed by the underlying application framework, and vice versa. Further, any application framework may be used according to the techniques disclosed herein, including application frameworks implementing the MapReduce interface from Google, Inc., such as Hadoop®, which is available from the Apache Software Foundation.

In one embodiment, once the application framework is configured, the application framework splits the input data set into a multiple subsets, to be processed in parallel on the cluster of compute nodes. To this end, each compute node executes the map operation in parallel on a respective subset of the input data, to create a subset of intermediate data. The application framework then provides the intermediate data as input to the reduce operation, which executes on each compute node. The reduce operation generates an output data set, which is stored in the desired location as specified by the application during the configuration process. At least in some embodiments, a user only desires the map operation to be performed. In such embodiments, the application may not necessarily provide any implementation of the reduce operation to the application framework. Accordingly, in such embodiments, the intermediate data generated by the map operation may be regarded as the final output and may be stored in the desired location as specified by the application.

In one embodiment, the map operation outputs the intermediate data in the format of multiple pairs of data, each pair including a key and an associated value. Further, the reduce operation may accept, as input, data in the format of the multiple pairs of data. The output of the reduce operation may also be in the format of the multiple pairs of data. To illustrate usage of the format of multiple pairs of data by the map operation and/or reduce operation, suppose a user desires to generate a count of each word in the English language that appears in a plurality of documents. In this particular example, the format of multiple pairs of data may represent a count of occurrences of each English word across the documents. Each key stores an English word and each value stores a corresponding count of occurrences of the English word as determined by the map operation and/or reduce operation. Suppose that the application framework schedules each compute node to perform the map operation on a respective document. The intermediate data generated by the map operation represents the occurrences of each word in the respective document. The application framework may then schedule each compute node to perform a reduce operation, which tallies the occurrences across all of the documents to generate the output data set. Although the above example is described with reference to a plurality of documents as input data to the map operation, in other embodiments, the input data to the map operation may also be formatted as multiple pairs of data, each pair including a key and an associated value.

As described above, in one embodiment, the application generates predictive models from multiple data sources in a distributed computing environment. To this end, the application may use the application framework executing in the distributed computing environment. Additionally or alternatively, the application may also adhere to a predefined architecture for generating predictive models. In some embodiments, the architecture for generating predictive models may facilitate generating predictive models from various types of data sets. The types of data sets may include a first type representing a single data source to be processed in a single pass to generate a single predictive model. The types of data sets may also include a second type representing real-time data streams to be processed to generate a predictive model. The types of data sets may also include a third type representing distributed data sources. In some embodiments, the distributed data sources may include a plurality of predictive models to be combined to generate a single predictive model, without accessing any data set from which the plurality of predictive models is generated. Depending on the embodiment, some or all of the functionality of the application adhering to the predefined architecture may be performed by the underlying application framework. One example of an architecture that the application may adhere to is the Pass-Stream-Merge (PSM) architecture by Leland Wilkinson.

In one embodiment, to generate predictive models from multiple data sources in a distributed computing environment, the application may implement a map operation configured to generate a base model for each data source. The map operation may also be configured to extract a validation sample and a holdout sample from the respective data source. In some embodiments, the validation sample and the holdout sample may be extracted randomly from the respective data source. The application may also implement a reduce operation that is configured to generate an ensemble model based on a subset of base models generated by the map operation. The subset of base models may be selected by evaluating all base models against the extracted validation samples. Accordingly, the ensemble model may be generated without first requiring all of the data sources or base models to be merged. Advantageously, the ensemble model may be generated more conveniently and/or efficiently at least in some cases.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, an application framework may execute in the cloud, where the application framework is configured to generate one or more predictive models from multiple data sets stored in the cloud. Having the application framework execute in the cloud allows the user to access the predictive models from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for generating one or more predictive models from multiple data sources, according to one embodiment of the invention. The networked system 100 includes a computer 102 that is connected to multiple data sources 170 via a network 130. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices. Further, as described above, the application 150 receives identity records and/or entity accounts from the data source 170. Additionally or alternatively, the application 150 may also receive identity records and/or entity accounts via the storage 108.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

In one embodiment, input data for generating a predictive model is divided into three datasets: a training dataset, a validation dataset, and a holdout dataset. The training dataset is used to generate base models. More specifically, each base model is generated by applying a specified learning method on a given portion of the training dataset. The specified learning method may be tailored for the needs of a particular case. For example, the specified learning method may be a supervised learning method such as decision tree, neural network and regression. The validation dataset is used for selecting base models based on predefined criteria. The holdout dataset is used to evaluate the selected base models. An ensemble model refers to a collection of generated base models and one or more rules for combining predictions of the base models. In some embodiments, a reference model is generated from the validation dataset to be used to evaluate the ensemble model.

As shown, the memory 106 of the computer 102 includes an application 150 and an application framework 152. The storage 108 of the computer 102 includes a global validation dataset 154, a global holdout dataset 156, base models 158 and an ensemble model 160. As described above, the application 150 and the application framework 152 are configured to generate the ensemble model 160 from the data sources 170. To this end, the global validation dataset 154, the global holdout dataset 156, and the base models 158 may first be generated from the data sources 170, according to the techniques disclosed below. Further, although the application 150 and the application framework 152 are shown to be executing on the single computer 102, in other embodiments, the application 150 and/or the application framework 152 may execute in parallel across multiple compute nodes connected via the network 130.

Figure 2:
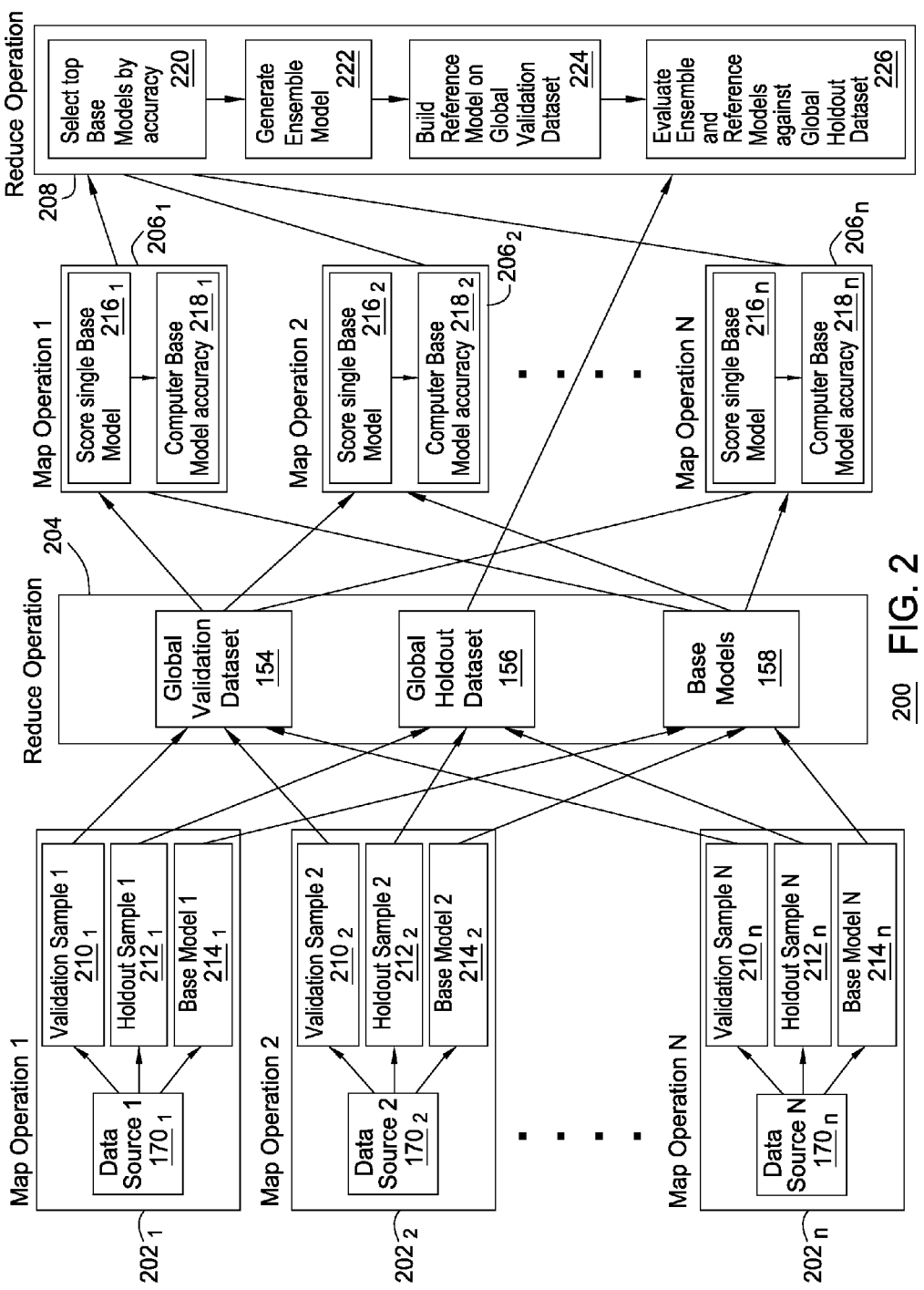
FIG. 2 illustrates a data flow for generating an ensemble model from multiple data sources, according to one embodiment of the invention.

FIG. 2 illustrates a data flow 200 for generating an ensemble model from multiple data sources, according to one embodiment of the invention. As shown, the data flow 200 includes a map operation 202 for each data source 170. Each map operation 202 generates a validation sample 210, a holdout sample 212 and a base model for the respective data source 170. The data flow 200 also includes a first reduce operation 204, which generates the global validation dataset 154 from the validation sample 210 of each data source 170. The first reduce operation 204 also generates the global holdout dataset 156 from the holdout sample 212 of each data source 170. In some embodiments, the first reduce operation 204 also generates the base models 158 from the base model 214 of each data source 170 by copying each base model 214 to a central location. In other embodiments, the base models 158 need not be generated and the base models 214 need not be copied to any central location. Instead, it may be sufficient that the base model 214 of each data source 170 is accessible by the subsequent map operation 206.

In one embodiment, the data flow 200 also includes a further map operation 206 corresponding to each data source 170. In this regard, the map operation 206 does not necessarily access the respective data source 170 and may merely access the global validation dataset 154 to evaluate one or more base models. The map operation 206 includes a first step 216 of scoring the base model 214 corresponding to the respective data source 170. Scoring the base model 214 may include computing a score or prediction for each record in the global validation dataset 154. The map operation 206 includes a second step 218 of determining an accuracy of the base model 214 against the global validation dataset 154. Determining an accuracy of the base model 214 may include comparing the computed scores against target values in the global validation dataset 154. In doing so, each base model 214 is compared using data other than the source data from which the respective base model 214 is generated. As an example, suppose the input data represents customer loan defaults and associated customer background information. The input data may include a loan default flag that stores a value of "1" to represent a loan default and a value of "0" to represent an absence of the loan default. In one embodiment, a score of either "1" or "0" is generated for each customer represented in the global validation dataset, using the base models and the customer background information, where the base models are generated using a different dataset and/or data source 170, relative to the global validation dataset. A generated score is correct when the generated score matches an actual loan default value for a respective customer. The accuracy of the base model may be determined as a percentage of correct scores for a given dataset. For example, if the scores in base model are correct for 350 out of 500 customers in the dataset, then the accuracy may be computed as seventy percent.

In one embodiment, the data flow 200 also includes a second reduce operation 208, which includes a first step 220 of selecting a subset of the base models based on the accuracy determined in the step 216. The second reduce operation 208 also includes a second step 222 of generating the ensemble model 160 from the subset of the base models. The second reduce operation 208 also includes a third step 224 of generating the reference model 162 from the global validation dataset 154. The second reduce operation 208 also includes a fourth step 226 of evaluating the ensemble model 160 and the reference model 162 against the global holdout dataset 156. Based on the evaluation, the application 150 may designate either the ensemble model 160 or the reference model 162 for use in data modeling and/or predictive scoring. In one embodiment, predictive scoring refers to using data models for predictive purposes, such as deriving knowledge about input data or an underlying process represented by the input data. Users may review the data model to identify relevant predictors and an associated measure of influence. Additionally, users may review an ensemble model to identify measures of importance of one or more variables. Accordingly, by performing the map operations 202, 206 and reduce operations 204, 208, the application 150 may generate the ensemble model 160 without first requiring all of the data sources 170 or base models 214 to be merged.

Figure 3:
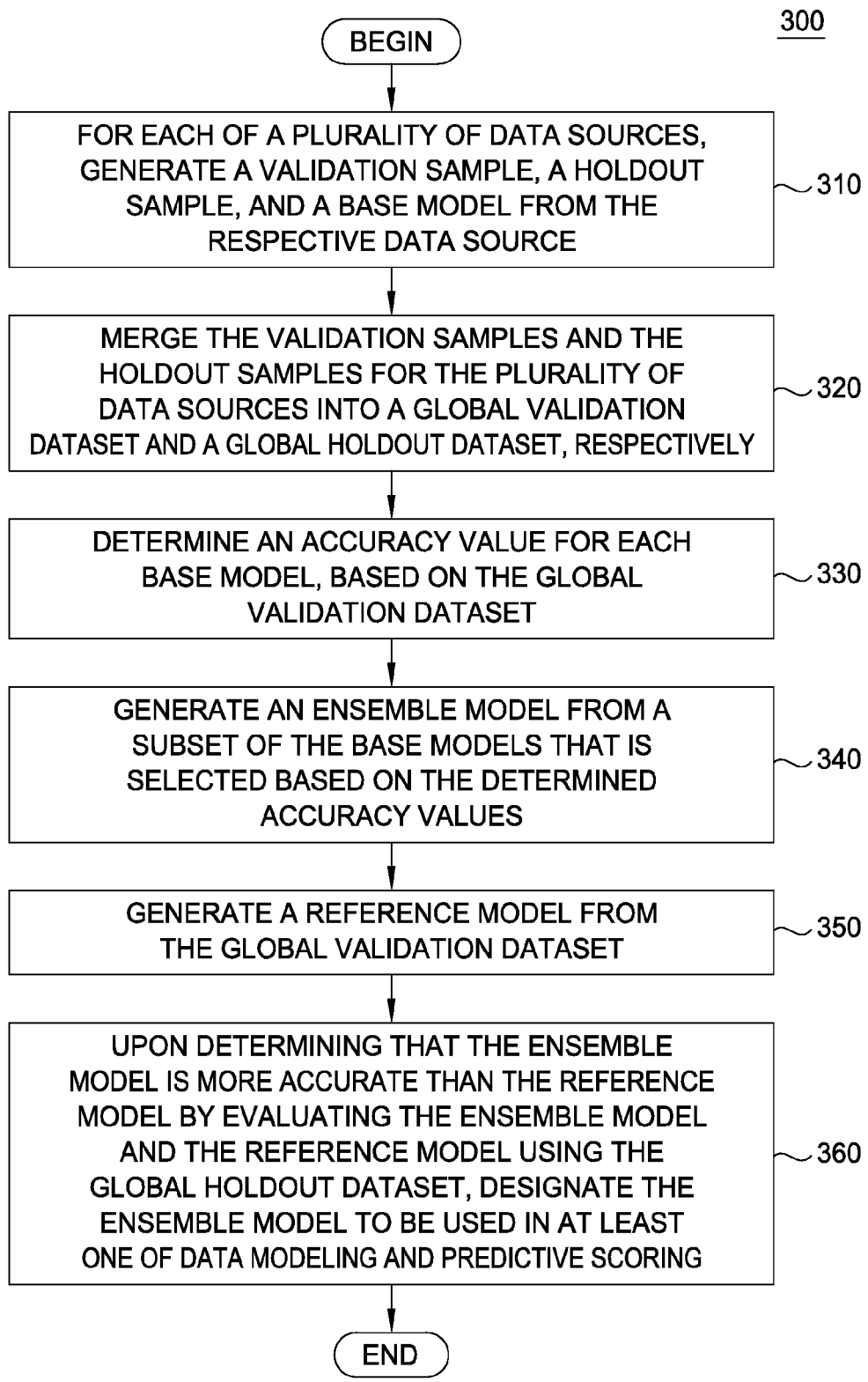
FIG. 3 is a flowchart depicting a method for generating an ensemble model from multiple data sources, according to one embodiment of the invention.

FIG. 3 is a flowchart depicting a method 300 for generating an ensemble model from multiple data sources, according to one embodiment of the invention. The method 300 may correspond to the data flow 200 of FIG. 2. As shown, the method 300 begins at step 310, where the application 150 generates a validation sample, a holdout sample and a base model for each of a plurality of data sources. At step 320, the application merges the validation samples and the holdout samples into a global validation dataset and a global holdout dataset, respectively. At step 330, the application 150 evaluates each base model against the global validation dataset, to determine an accuracy value for the respective base model.

At step 340, the application 150 generates an ensemble model from a subset of the base models, the subset being selected based on the determined accuracy values. At step 350, the application 150 generates a reference model from the global validation dataset. At step 360, the application 150 evaluates the ensemble model and the reference model using the global holdout dataset. If the ensemble model is determined to be more accurate than the reference model, then the application 150 designates the ensemble model to be used in at least one of data modeling and predictive scoring. Otherwise, the application 150 designates the reference model to be used in at least one of data modeling and predictive scoring. After the step 360, the method 300 terminates.

Figure 4:
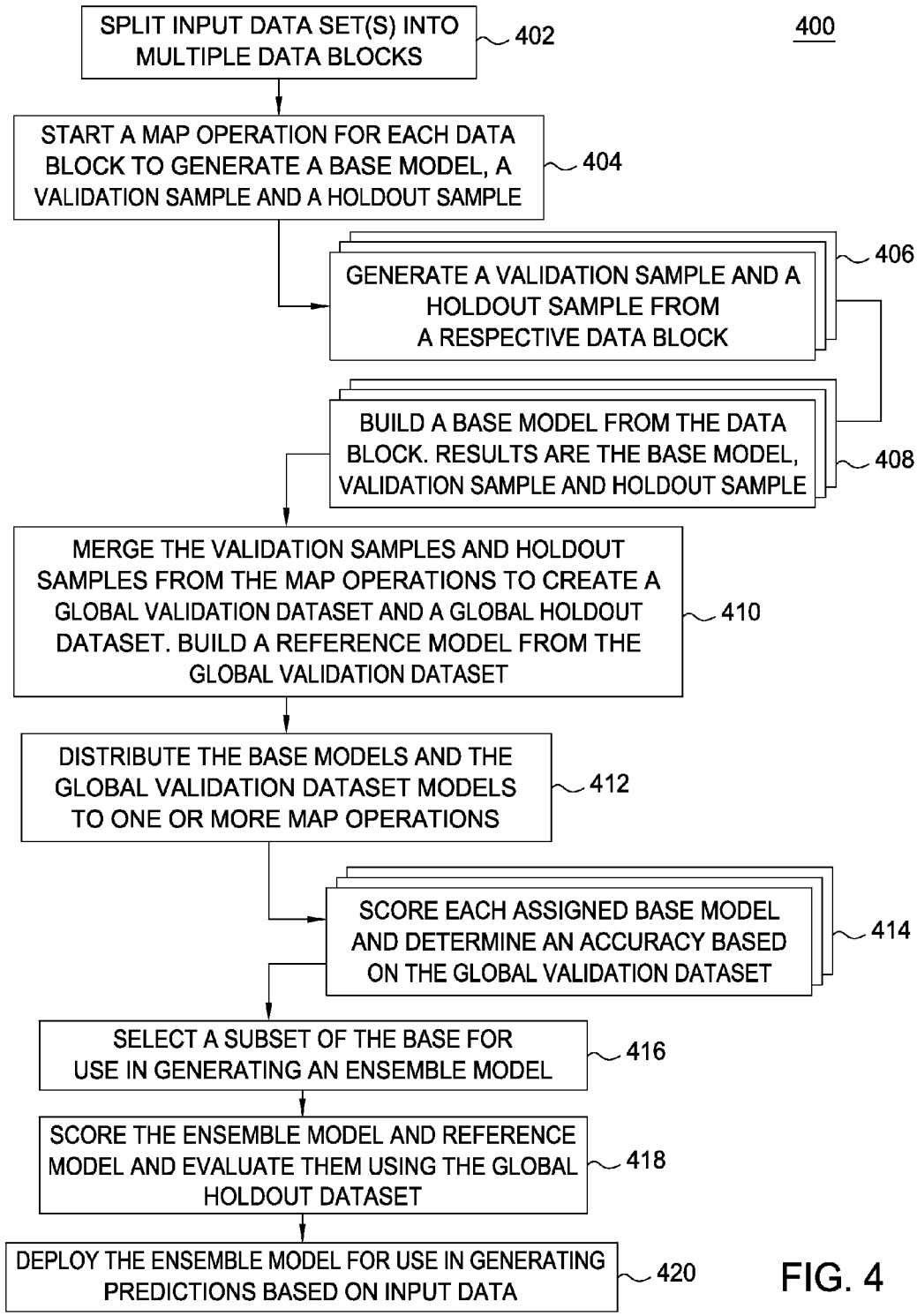
FIG. 4 is a flowchart depicting a method for generating an ensemble model from multiple data sources, according to another embodiment of the invention.

FIG. 4 is a flowchart depicting a method 400 for generating an ensemble model from multiple data sources, according to another embodiment of the invention. As shown, the method 400 begins at step 402, where the application framework 152 splits the input data sets into a plurality of data blocks. In one embodiment, a data block refers to a portion of the input data, the portion falling within a predefined range of sizes. The predefined range of sizes may be determined such that each data block is large enough for generating a reliable base model and small enough to generate the base model efficiently. The reliability of a base model and/or the efficiency with which a base model is generated may also be measured based on respective predefined thresholds.

At step 404, application framework 152 initiates a map operation for each data block, to generate a base model, a validation sample, and a holdout sample for the respective data block. The base model may be stored in a base model container and the validation sample and the holdout sample may both be stored in a data container. Depending on the embodiment, both the validation sample and the holdout sample may be generated using a single predefined randomization procedure. In other embodiments, the validation sample and the holdout sample are generated using different predefined procedures. Further, in some embodiments, data that is not included in any sample may be designated as training data for use in generating the base model. In this regard, the base model may be generated only from data that is not included in any sample.

At step 406, each map operation generates a validation sample and a holdout sample from the respective data block. At step 408, each map operation generates a base model from the data block. At step 410, the application framework 152 initiates one or more reduce operations to merge the validation samples and holdout samples from the map operations to create a global validation dataset and a global holdout dataset, respectively.

In some embodiments, for reasons relating to scalability and/or performance, the sizes of each of the global validation dataset and the global holdout dataset may be limited to a first predefined maximum size. In one embodiment, the first predefined maximum size is enforced by only merging a portion of each holdout sample and/or validation sample into the global validation dataset and/or the global holdout dataset, where the portion does not exceed a second predefined maximum size. Depending on the embodiment, the second predefined maximum size may be determined by dividing the first predefined maximum size by a count of data blocks generated by the application framework 152. In an alternative embodiment, each holdout sample and/or validation sample is limited in size to a third predefined maximum size. The third predefined maximum size may be determined by dividing the second predefined maximum size by a count of map operations initiated by the application framework 152. In this alternative embodiment, the holdout samples and/or validation samples may be merged into the global validation dataset and the global holdout dataset, respectively, without having to impose any size limits during the merging operations.

In one embodiment, the application framework 152 also generates a reference model from the global validation dataset. The single predictive model deployed for generating predictions is ultimately selected from the reference model and the ensemble model based on accuracy. In this sense, the reference model serves as a competitor to the ensemble model for deployment in generating predictions. At step 412, the application framework 152 distributes the base models and the global validation dataset to one or more map operations. At step 414, the one or more map operations score each base model and determine an accuracy for the respective base model, on the basis of the global validation dataset. In at least some embodiments, each of the one or more map operations accesses the entire global validation dataset at the step 414. At step 416, the application framework 152 selects a subset of the base models for use in generating an ensemble model. At step 418, the application framework 152 scores the ensemble model and reference model. The application framework 152 may then evaluate the ensemble model and the reference model against the global holdout dataset. At step 420, upon determining that the ensemble model is more accurate than the reference model, the application framework 152 deploys the ensemble model for use in generating predictions based on subsequent input data. After the step 420, the method 400 terminates.

Advantageously, embodiments of the invention provide techniques for generating an ensemble model from multiple data sources. One embodiment provides an application configured to generate the ensemble model using a global validation sample, a global holdout sample, and base models generated from the multiple data sources. The application may also determine an accuracy value for each base model, based on the global validation dataset. The application may also generate an ensemble model from a subset of the base models that are selected based on the determined accuracy values. Accordingly, the ensemble model may be generated without first having to merge data from the data sources into a single data source. Advantageously, the ensemble model may be generated more conveniently and/or efficiently at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:

using a first map operation, for each of a plurality of data sources, generating a validation sample from the respective data source and a base model by applying a specified learning technique to data in the respective data source that was not included in any sample;

using a first reduce operation, merging a portion of the validation samples that does not exceed a predefined maximum size for the plurality of data sources into a global validation dataset;

using a second map operation, scoring each base model by computing a score for each record in the global validation dataset;

using the second map operation, for each of the plurality of data sources, determining an accuracy value for each base model based on the global validation dataset and by operation of one or more computer processors by comparing each computed score against a target value in the global validation dataset, wherein each base model is compared using data from a data source other than the data source from which the base model was generated, wherein the computed score for a record is correct when the computed score matches a corresponding target value and wherein an accuracy value of each base model is determined as a percentage of correct scores; and using a second reduce operation, generating an ensemble model that includes a subset of the base models that are selected based on the determined accuracy values and that includes one or more rules for combining predictions of the subset of the base models.

2. The computer-implemented method of claim 1, further comprising:

generating a reference model from the global validation dataset.

3. The computer-implemented method of claim 2, further comprising:

evaluating the ensemble model and the reference model using a global holdout dataset; and designating one of the ensemble model and the reference model to be used in at least one of data modeling and predictive scoring.

4. The computer-implemented method of claim 3, further comprising:

determining that the ensemble model is more accurate than the reference model, based on the evaluating.

5. The computer-implemented method of claim 4, further comprising:

designating the ensemble model to be used in at least one of the data modeling and the predictive scoring.

* * * * *